(12) United States Patent
Ohashi et al.

(10) Patent No.: US 10,081,224 B2
(45) Date of Patent: Sep. 25, 2018

(54) SUSPENSION SYSTEM

(71) Applicant: TOYOTA JIDOSHA KABUSHIKI KAISHA, Toyota-shi, Aichi-ken (JP)

(72) Inventors: Hideki Ohashi, Chiryu (JP); Jun Tokumitsu, Toyota (JP); Ryo Kanda, Nissin (JP); Shogo Tanaka, Toyota (JP); Kohtaroh Okimura, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 15/348,732

(22) Filed: Nov. 10, 2016

(65) Prior Publication Data

US 2017/0151852 A1 Jun. 1, 2017

(30) Foreign Application Priority Data

Nov. 27, 2015 (JP) .................................. 2015-231374

(51) Int. Cl.
*B60G 17/018* (2006.01)
*B60G 17/052* (2006.01)
*B60G 17/015* (2006.01)

(52) U.S. Cl.
CPC ....... *B60G 17/018* (2013.01); *B60G 17/0155* (2013.01); *B60G 17/0525* (2013.01);
(Continued)

(58) Field of Classification Search
CPC ........................... B60G 17/017; B60G 17/018; B60G 17/0525; B60G 2500/30; B60G 2800/912; B60G 2800/914; B60G 17/0155
See application file for complete search history.

(56) References Cited

U.S. PATENT DOCUMENTS 4,651,838 A * 3/1987 Hamilton ........... B60G 17/0155
177/141
4,821,191 A * 4/1989 Ikemoto ............... B60G 17/016
280/5.508
(Continued)

FOREIGN PATENT DOCUMENTS

DE    199 128 98 C1    11/2000
DE    102 44 363 A1    4/2004
(Continued)

OTHER PUBLICATIONS

Jazar, Reza N., Vehicle Dynamics: Theory and Application (Chapter 8: Suspension Mechanisms and Chapter 14: Suspension Optimization), 2008, Springer US, pp. 456-517 and 883-930 (Year: 2008).*

*Primary Examiner* — Behrang Badii
*Assistant Examiner* — David A Testardi
(74) *Attorney, Agent, or Firm* — Oliff PLC

(57) ABSTRACT

A suspension system includes: suspensions that respectively include vehicle height control actuators; a pressure medium supply-discharge device; and a vehicle height controller configured to control the pressure medium supply-discharge device to control vehicle height, wherein a magnitude of resistance that is generated during a change in the vehicle height at one or more of the suspensions is larger than a magnitude of resistance at another one or more of the suspensions, and the vehicle height controller is configured to execute vehicle height control for the wheel that corresponds to the one or more of the suspensions with the large magnitude of the resistance prior to vehicle height control for the wheel that corresponds to the other one or more of the suspensions with the small magnitude of the resistance.

5 Claims, 10 Drawing Sheets

(52) U.S. Cl.
CPC ...... *B60G 2204/62* (2013.01); *B60G 2204/80* (2013.01); *B60G 2400/252* (2013.01); *B60G 2400/51* (2013.01); *B60G 2400/952* (2013.01); *B60G 2500/30* (2013.01); *B60G 2800/914* (2013.01)

(56) References Cited

U.S. PATENT DOCUMENTS

| | | | | |
|---|---|---|---|---|
| 4,829,436 A | * | 5/1989 | Kowalik | B60G 17/017 280/5.508 |
| 4,965,878 A | * | 10/1990 | Yamagiwa | B60G 17/016 180/41 |
| 5,013,067 A | * | 5/1991 | Mine | B60G 17/0165 280/5.507 |
| 5,046,754 A | * | 9/1991 | Kimura | B60G 17/017 280/6.152 |
| 5,258,913 A | * | 11/1993 | Baldauf | B60G 17/017 254/423 |
| 5,287,277 A | * | 2/1994 | Mine | B60G 17/0165 280/5.514 |
| 5,452,919 A | * | 9/1995 | Hoyle | B60G 17/0155 280/5.505 |
| 6,098,994 A | * | 8/2000 | Kunishima | B60G 17/016 280/5.5 |
| 6,202,010 B1 | * | 3/2001 | Shono | B60G 17/017 180/41 |
| 6,240,348 B1 | * | 5/2001 | Shono | B60G 17/017 280/124.159 |
| 6,282,470 B1 | * | 8/2001 | Shono | B60G 17/015 180/41 |
| 2005/0189729 A1 | | 9/2005 | Dorr | |
| 2006/0055129 A1 | * | 3/2006 | Amano | B60G 17/015 280/5.507 |
| 2010/0052272 A1 | * | 3/2010 | Beilmann | B60G 17/0155 280/6.16 |
| 2015/0231944 A1 | * | 8/2015 | Oldenettel | B60G 17/0155 701/37 |

FOREIGN PATENT DOCUMENTS

| | | | |
|---|---|---|---|
| DE | 10 2010 032 046 A1 | | 1/2012 |
| JP | 60259512 A | * | 12/1985 |
| JP | 02204115 A | * | 8/1990 |
| JP | H03-70615 A | | 3/1991 |
| JP | 07125521 A1 | * | 5/1995 |
| JP | 08108722 A | * | 4/1996 |
| JP | 09011725 A | * | 1/1997 |
| JP | 10278533 A | * | 10/1998 |
| JP | 2008247209 A | * | 10/2008 |
| JP | 2009255779 A | * | 11/2009 |

* cited by examiner

| PRIORITY RANKING | VEHICLE WHEEL POSITION | |
|---|---|---|
| 1 | REAR RIGHT | UP |
| 2 | REAR LEFT | UP |
| 3 | REAR RIGHT | DOWN |
| 4 | REAR LEFT | DOWN |
| 5 | FRONT RIGHT | UP |
| 6 | FRONT LEFT | UP |
| 7 | FRONT RIGHT | DOWN |
| 8 | FRONT LEFT | DOWN |

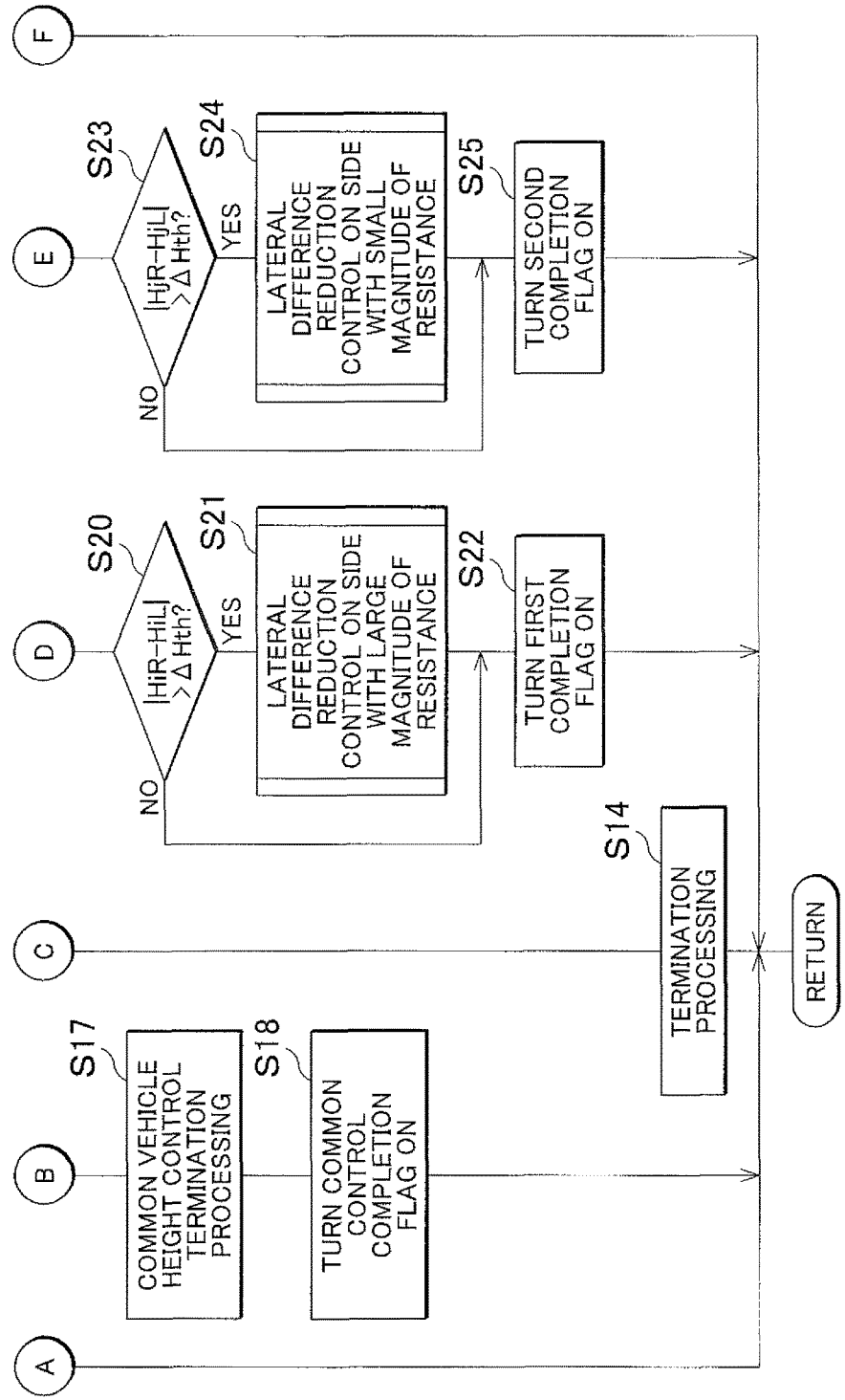

SUSPENSION SYSTEM

INCORPORATION BY REFERENCE

The disclosure of Japanese Patent Application No. 2015-231374 filed on Nov. 27, 2015 including the specification, drawings and abstract is incorporated herein by reference in its entirety.

BACKGROUND

1. Field of the Disclosure

The disclosure relates to a suspension system that executes vehicle height control.

2. Description of Related Art

A suspension system described in Japanese Patent Application Publication No. 3-70615 (JP 3-70615 A) controls a supply and discharge of air to/from an air cylinder that is provided to correspond to each of four wheels. In this way, vehicle height at each of the four wheels is brought closer to target vehicle height.

SUMMARY

The disclosure provides a suspension system that brings actual vehicle height, which is actual vehicle height at each of wheels, to target vehicle height.

The aspect of the present disclosure is a suspension system including: suspensions that respectively include vehicle height control actuators provided between a plurality of wheels of a vehicle and a vehicle body; a pressure medium supply-discharge device configured to supply a pressure medium to each of the vehicle height control actuators or discharge the pressure medium from each of the vehicle height control actuators; and a vehicle height controller configured to control the pressure medium supply-discharge device to control vehicle height that is a distance between each of the plurality of wheels and the vehicle body, wherein a magnitude of resistance that is generated during a change in the vehicle height at one or more of the suspensions is larger than a magnitude of resistance at another one or more of the suspensions, and the vehicle height controller is configured to execute vehicle height control for the wheel that corresponds to the one or more of the suspensions with the large magnitude of the resistance prior to vehicle height control for the wheel that corresponds to the other one or more of the suspensions with the small magnitude of the resistance.

According to the above aspect, for each of the wheels of the vehicle, the vehicle height control for the wheel with the large magnitude of the resistance generated in the suspension during the change in the vehicle height is executed prior to the vehicle height control for the wheel with the small magnitude of the resistance. Compared to the wheel with the small magnitude of the resistance, accompaniment is less likely to occur to the wheel with the large magnitude of the resistance generated in the suspension. Accordingly, the vehicle height control for the wheel with the large magnitude of the resistance generated in the suspension is executed prior to the vehicle height control for the wheel with the small magnitude of the resistance. In this way, when the vehicle height control is later executed for the wheel with the small magnitude of the resistance, it is possible to suppress the change in the vehicle height that is caused by the accompaniment of the wheel (with the large magnitude of the resistance), for which the vehicle height control is executed earlier. Therefore, for each of the wheels, the actual vehicle height can promptly be brought close to the target vehicle height.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8B is a flowchart of a vehicle height control program that is stored in the memory section of the above vehicle height control ECU.

DETAILED DESCRIPTION OF EMBODIMENTS

A detailed description will hereinafter be made on a suspension system as one embodiment of the disclosure on the basis of the drawings. In this suspension system, air is used as a pressure medium.

Figure 1:
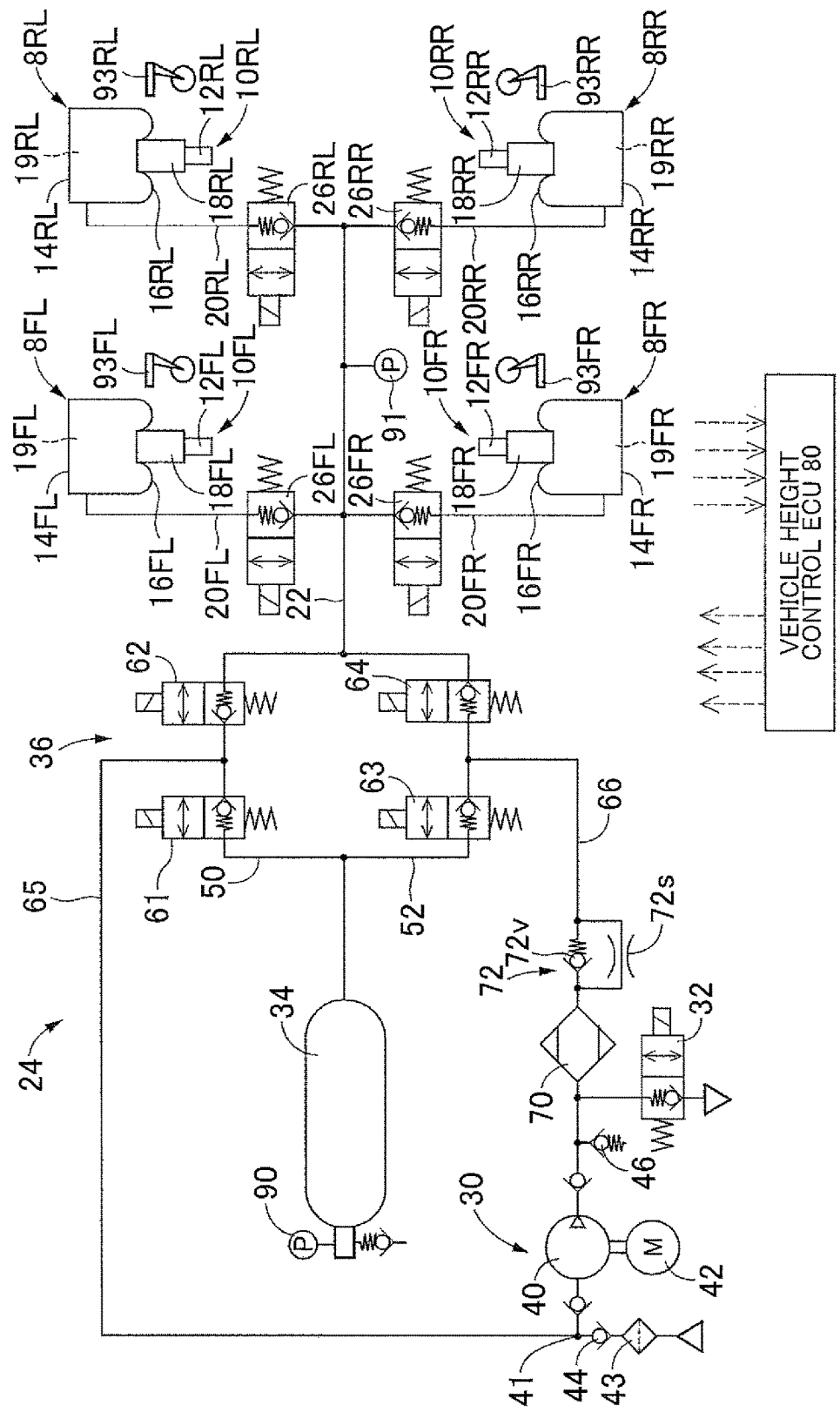
FIG. 1 is a circuit diagram of a suspension system according to a first embodiment of the disclosure.
Figure 2:
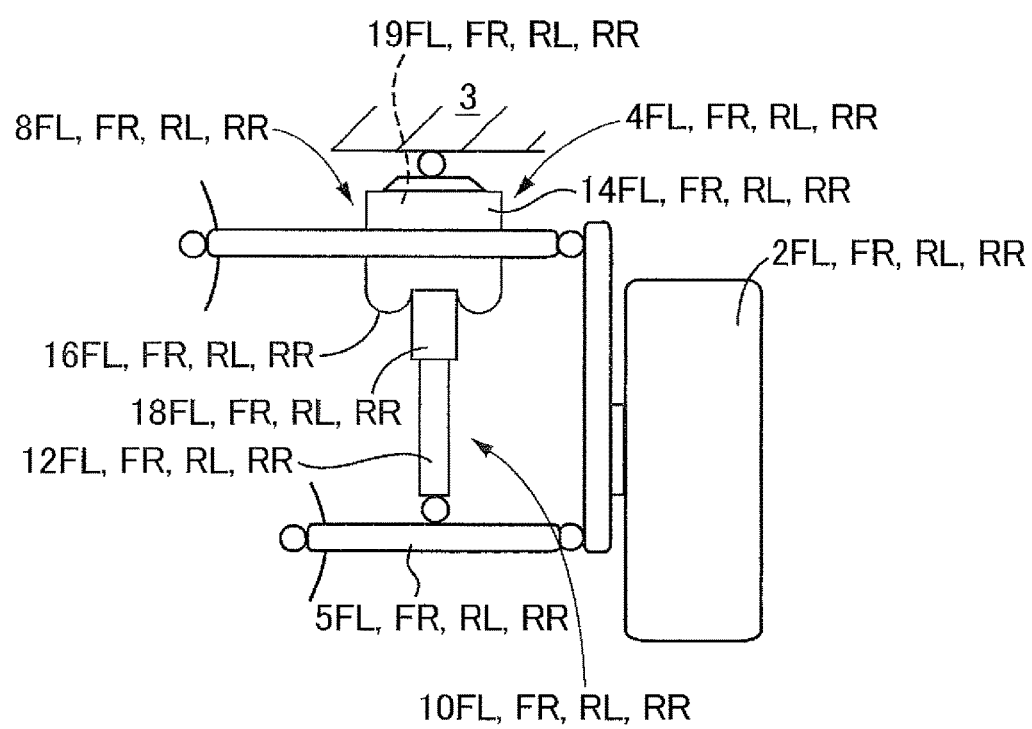
FIG. 2 is a schematic view of a suspension in the above suspension system.

As shown in FIGS. 1, 2, in regard to a suspension system according to a first embodiment, suspensions 4FL, FR, RL, RR are respectively provided between a vehicle body 3 and front/rear, left/right wheels 2FL, FR, RL, RR that are provided in a vehicle. The suspensions 4FL, FR, RL, RR respectively include (i) suspension arms 5FL, FR, RL, RR and the like that are respectively coupled to the wheels 2FL, FR, RL, RR and the vehicle body 3 in rotatable manners and (ii) air cylinders 8FL, FR, RE, RR, shock absorbers 10FL, FR, RL, RR, and the like that serve as vehicle height control actuators and are provided in parallel with each other between the vehicle body 3 and the suspension arms 5FL, FR, RL, RR. In the following description of this specification, the air cylinders 8, the shock absorbers 10, the suspensions 4, and the like, which are described above, will be distinguished by using the reference symbols FL, FR, RL, RR, which indicate positions of the wheels 2, when there is a need to distinguish these components by the positions of the wheels 2. However, these will be described without the reference symbols FL, FR, RL, RR, and the like, which indicate the positions of the wheels 2, when there is no need to distinguish these components by the positions of the wheels 2, when these are collectively referred, and the like. Note that a double wishbone suspension is shown in FIG. 2; however, a type of the suspension that is provided to correspond to each of the wheels 2FL, FR, RL, RR is not limited thereto. In addition, the suspensions that correspond to the four wheels 2FL, FR, RL, RR may be of the same type, or different types of the suspensions may be adopted for the front wheel side and the rear wheel side.

The shock absorbers 10 each include: a cylinder body 12 that is provided on the suspension arm 5; and a piston that is provided on the vehicle body 3 and is not shown. The air cylinders 8 each include: a chamber 14 as a cylinder body that is provided on the vehicle body 3; a diaphragm 16 that is fixed to the chamber 14; and an air piston 18 that is provided in such a manner as to be incapable of moving relative to the diaphragm 16 and the cylinder body 12 of the shock absorber 10 in a vertical direction. The inside of these components serves as an air chamber 19 that is a pressure medium chamber. A supply or discharge of the air to/from the air chamber 19 causes relative movement of the air piston 18 to the chamber 14 in the vertical direction, which further causes relative movement of the cylinder body 12 and the piston in the shock absorber 10 in the vertical direction. In this way, vehicle height, which is a distance between the wheel 2 and the vehicle body 3, is changed.

An air supply-discharge device 24 as a pressure medium supply-discharge device is connected to the air chambers 19 of the air cylinders 8 via individual passages 20 and a common passage 22. Each of the individual passages 20 is provided with an individual vehicle height control valve (hereinafter referred to as a vehicle height regulating valve) 26. The vehicle height regulating valve 26 is a constantly-closed electromagnetic valve, allows bi-directional airflow in its opened state, and inhibits the airflow from the air chamber 19 to the common passage 22 in its closed state. However, when pressure in the common passage 22 becomes higher than pressure in the air chamber 19 at least by setup pressure, the vehicle height regulating valve 26 allows the airflow from the common passage 22 to the air chamber 19.

The air supply-discharge device 24 includes a compressor device 30, an exhaust valve 32, a pressure accumulation tank 34, a switching device 36, and the like. The compressor device 30 includes: a compressor 40; an electric motor 42 that drives the compressor 40; an intake valve 44 as a check valve that is provided between atmosphere and an air intake-side portion 41 as a portion on an air intake side of the compressor 40; a relief valve 46 that is provided on a discharge side of the compressor 40; and the like. When pressure in the air intake-side portion 41 of the compressor 40 becomes lower than atmospheric pressure, the compressor 40 suctions the air from the atmosphere via a filter 43 and the intake valve 44. When discharge pressure of the compressor 40 is increased, the air is discharged to the atmosphere through the relief valve 46. The pressure accumulation tank 34 accumulates the air in a pressurized state and accumulates the air in such a state where air pressure is higher than predetermined initial pressure.

The switching device 36 is provided between the common passage 22, the pressure accumulation tank 34, and the compressor device 30 so as to switch an airflow direction and the like therebetween. As depicted in FIG. 1, the common passage 22 and the pressure accumulation tank 34 are connected by a first passage 50 and a second passage 52 that are provided in parallel with each other. Two circuit valves 61, 62 are provided in series in the first passage 50, and two circuit valves 63, 64 are provided in series in the second passage 52. A third passage 65 is connected between the two circuit valves 61, 62 in the first passage 50 and is connected to the air intake side of the compressor 40. A fourth passage 66 is connected between the two circuit valves 63, 64 in the second passage 52 and is connected to the discharge side of the compressor 40. Each of the circuit valves 61 to 64 is a constantly-closed valve, allows the bi-directional airflow in its opened state, and inhibits the airflow from one side to the other side in its closed state. However, when pressure on the other side becomes higher than pressure on the one side at least by the setup pressure, each of the circuit valves 61 to 64 allows the airflow from the other side to the one side. The circuit valves 61, 63 inhibit an outflow of the air from the pressure accumulation tank 34 in their closed states, the circuit valve 62 inhibits the outflow of the air from the common passage 22 in its closed state, and the circuit valve 64 inhibits the supply of the air to the common passage 22 in its closed state.

The exhaust valve 32 is a constantly-closed electromagnetic valve that is provided on the discharge side of the compressor 40 in the fourth passage 66. In an opened state of the exhaust valve 32, discharge of the air from the fourth passage 66 to the atmosphere is allowed. In a closed state thereof, the discharge of the air from the fourth passage 66 to the atmosphere is inhibited. Note that, when the atmospheric pressure becomes higher than the pressure in the fourth passage 66 at least by setup pressure in the closed state of the exhaust valve 32, the supply of the air from the atmosphere to the fourth passage 66 is allowed. A dryer 70 and a flow suppression mechanism 72 are provided in series in a portion of the fourth passage 66 that is on the second passage side from the exhaust valve 32. The flow suppression mechanism 72 includes a differential pressure valve 72v and a restrictor 72s that are provided in parallel with each other. The differential pressure valve 72v inhibits the airflow from the second passage side to the compressor side, and, when the pressure on the compressor side becomes higher than the pressure on the second passage side at least by the setup pressure, allows the airflow from the compressor 40 to the second passage 52.

Figure 3:
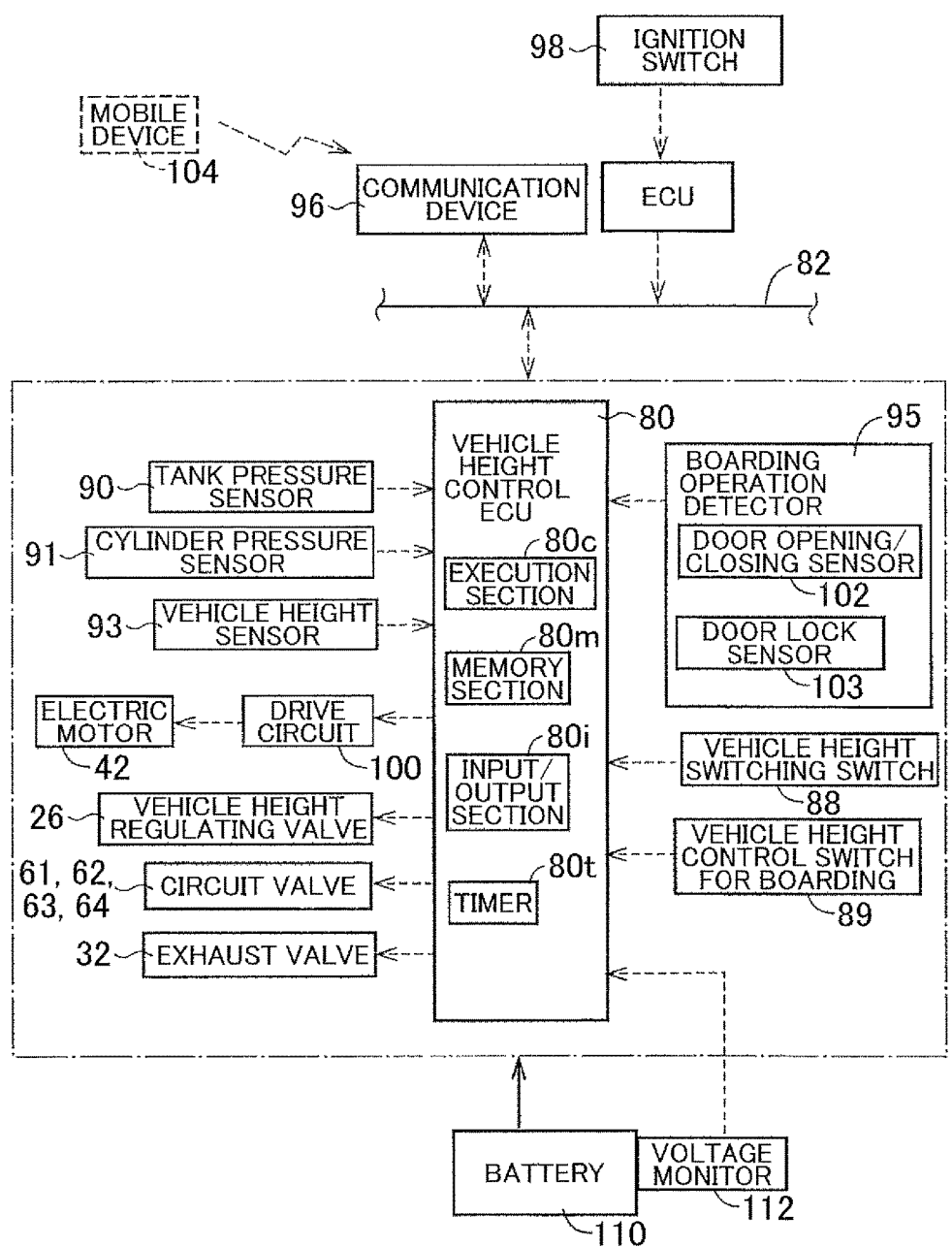
FIG. 3 is a schematic view of a periphery of a vehicle height control ECU that is provided in the above suspension system.

In this embodiment, the suspension system is controlled by a vehicle height control ECU 80 that has a computer as a main component. As shown in FIG. 3, the vehicle height control ECU 80 includes an execution section 80c, a memory section 80m, an input/output section 80i, a timer 80t, and the like. A vehicle height switching switch 88, a vehicle height control switch 89 for boarding, a tank pressure sensor 90, a cylinder pressure sensor 91, a vehicle height sensor 93, a boarding operation detector 95, and the like are connected to the input/output section 80i. A communication device 96, an ignition switch 98, and the like are also connected to the input/output section 80i via a CAN 82. In addition, the electric motor 42 is connected thereto via a drive circuit 100, and the exhaust valve 32, the vehicle height regulating valve 26, the circuit valves 61 to 64, and the like are connected thereto. The tank pressure sensor 90 detects the pressure of the air that is accumulated in the pressure accumulation tank 34. The cylinder pressure sensor 91 is provided in the common passage 22 and, when the vehicle height regulating valve 26 is opened, detects the pressure in the air chamber 19 of the air cylinder 8 that corresponds to the opened vehicle height regulating valve 26 (the wheel 2). The cylinder pressure sensor 91 detects the air pressure of the common passage 22 when all of the vehicle height regulating valves 26 are closed. The vehicle height sensor 93 is provided in a manner to correspond to each of the front/rear, left/right wheels 2 and detects a deviation from standard length (standard height) between the wheel 2 and the vehicle body 3. The boarding operation detector 95 detects presence or absence of an operation that is related to boarding, is provided in a manner to correspond to each of doors provided in the vehicle, and can include: a door opening/closing sensor (a courtesy lamp sensor) 102 that detects opening/closing of the door; a door lock sensor 103 that detects locking/unlocking of each of the doors; and the like. Boarding, unboarding, an intention of starting off, and the like are estimated based on presence or absence of the operations, such as opening/closing of the door and locking/unlocking of the door. The communication device 96 communicates with a mobile device 104 possessed by a driver within a predetermined communicable region. There is a case where the door is locked/unlocked through the communication. The vehicle height switching switch 88 and the vehicle height control switch 89 for boarding can be operated by the driver and is operated when an instruction to change the vehicle height is made. The suspension system and the like in this embodiment can be actuated by electric power of a battery 110. A voltage of the battery 110 is detected by a voltage monitor 112.

In the suspension system that is configured as described above, (a) in the case where the vehicle height switching switch 88 and the vehicle height control switch 89 for boarding are operated, (b) in the case where an appearance improvement condition is established, or the like, vehicle height control (the vehicle height control will hereinafter refer to control that is executed for the entire vehicle or control that is executed for one wheel or each of two wheels in this specification) is executed. In any of these cases, the vehicle height at each of the four wheels is controlled to be the same height. In the case where the vehicle height control switch 89 for boarding is operated, the vehicle height is increased to facilitate boarding and unboarding. In the case where the appearance improvement condition is established, the vehicle height is lowered to improve appearance of the vehicle (may be referred to as appearance improvement vehicle height control). For example, the appearance improvement condition includes the followings; the door is closed, the door is locked, or the ignition switch 98 remains off for a setup time or longer. In the case where the appearance improvement condition is established, the appearance improvement vehicle height control is executed.

Figure 4A:
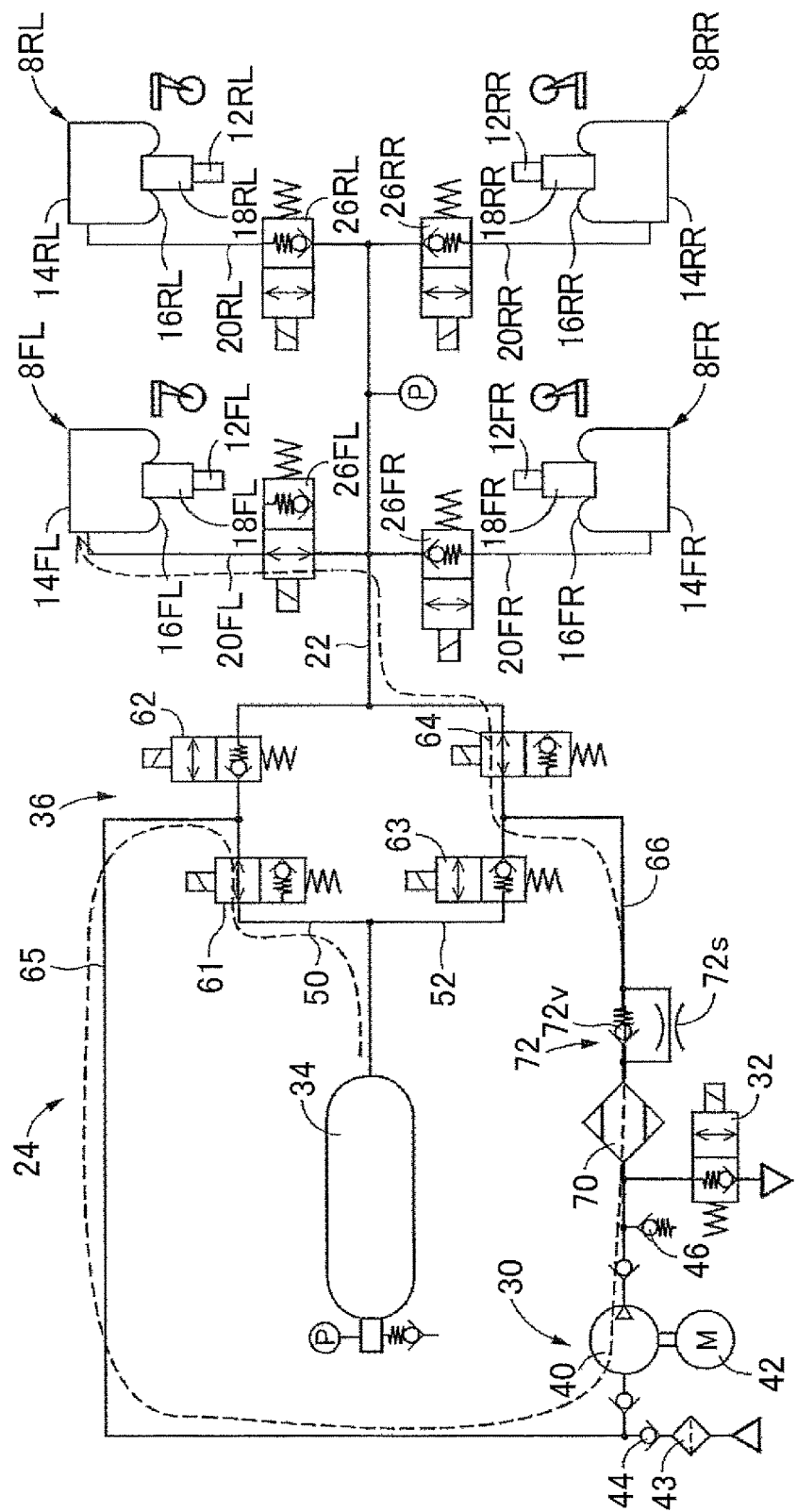
FIG. 4A is a view of a state where air is supplied to an air cylinder in the above suspension system.
Figure 4B:
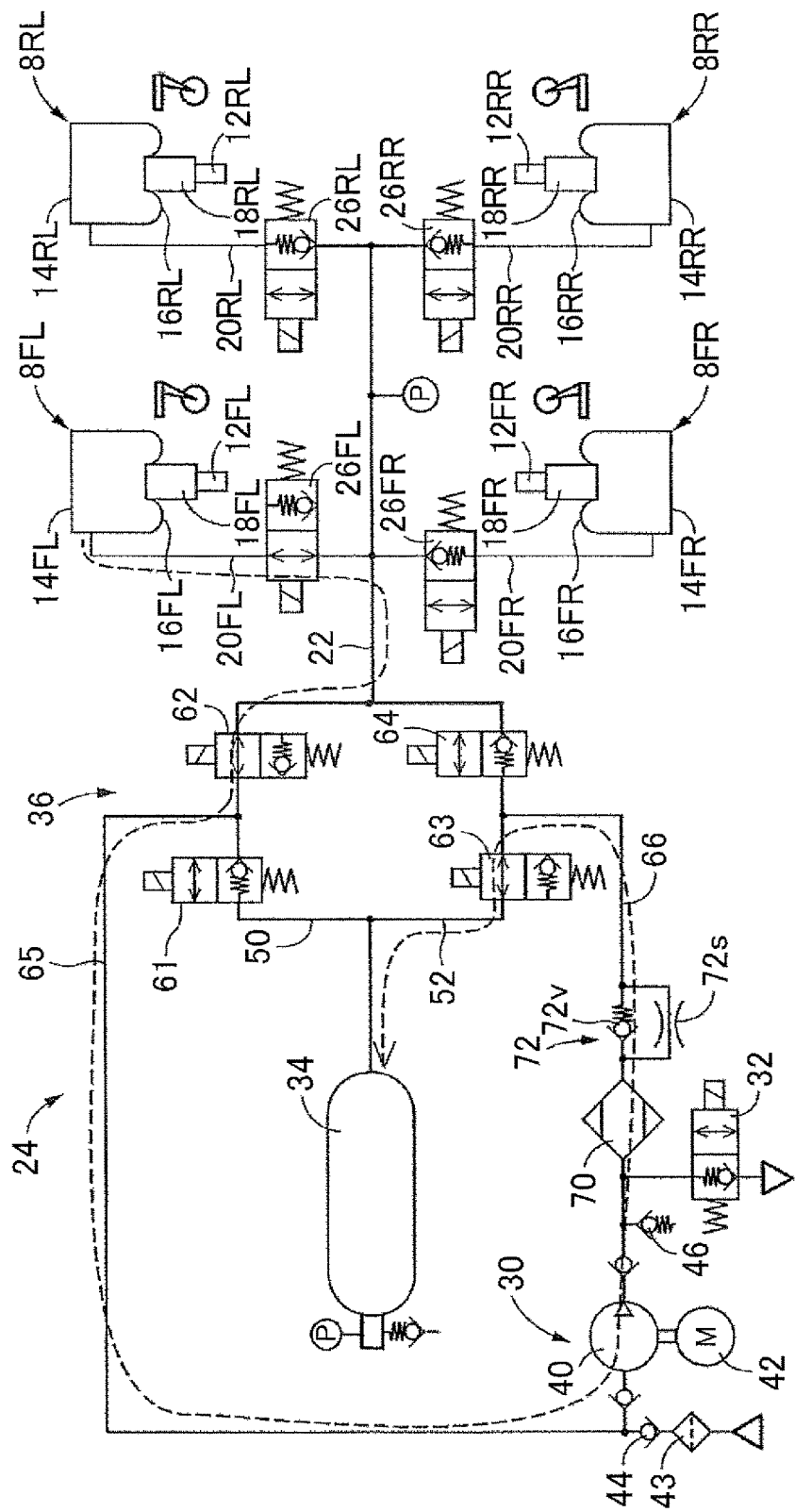
FIG. 4B is a view of a state where the air is discharged from the above air cylinder.

For example, when the vehicle height at the front left wheel 2FL is increased, as shown in FIG. 4A, the electric motor 42 is driven to actuate the compressor 40, so as to open the circuit valves 61, 64, close the circuit valves 62, 63, and open the vehicle height regulating valve 26FL. The air that is accumulated in the pressure accumulation tank 34 is supplied to the air chamber 19 of the air cylinder 8FL by the compressor 40. In this way, the vehicle height at the front left wheeler 2FL is increased. When the vehicle height is lowered, as shown in FIG. 4B, the electric motor 42 is driven to actuate the compressor 40, so as to close the circuit valves 61, 64, open the circuit valves 62, 63, and open the vehicle height regulating valve 26FL. The air in the air chamber 19 of the air cylinder 8FL is suctioned by the compressor 40 and is supplied to the pressure accumulation tank 34. Because the pressure accumulation tank 34 is provided, and the air that is accumulated in the pressure accumulation tank 34 is used, just as described, the vehicle height control can be executed in a short time, and boarding and unboarding properties can be improved.

The vehicle height control is executed at two stages of first control and second control. In the first control, the actual vehicle height, which is the actual vehicle height at each of the four wheels, is brought almost close to the target vehicle height. In the second control, the actual vehicle height is further brought closer to the target vehicle height.

By the way, in the vehicle height control, when the air is supplied to the air chamber 19 of the air cylinder 8 or the air is discharged therefrom, as shown in FIG. 2, the air piston 18 moves vertically with respect to the chamber 14, the cylinder body 12 moves vertically with respect to the piston, and the cylinder body 12 and the piston make relative movement to each other. In this way, in the shock absorber 10, friction resistance is generated due to the relative movement (sliding) of the cylinder body 12 and the piston, or fluid resistance by a fluid is generated in conjunction with opening/closing of the valve. In addition, the suspension arm 5 rotates relative to the wheel 2, the vehicle body 3, and the like in conjunction with the change in the vehicle height, and the friction resistance is possibly generated in this case. A magnitude of resistance that is generated on each of the suspensions 4 and includes the friction resistance, fluid resistance, and the like is not the same for the suspensions 4 that correspond to all of the wheels 2. For this reason, for example, in the cases where all of the vehicle height regulating valves 26 are opened in common control and all of the vehicle height regulating valves 26 are thereafter closed when the air is supplied to/discharged from all of the air cylinders 8 in a similar manner, and the actual vehicle height at the at least one wheel enters a range (Href±Δh) that is determined on the basis of target vehicle height Href and dead zone width Δh, a vehicle height difference is possibly generated among the four wheels 2.

The vehicle body 3 is a rigid body and is supported by four of the forward/rear, left/right wheels 2. Thus, when the vehicle height control is executed for one or two target wheels of the four wheels 2, so-called accompaniment occurs, which changes the vehicle height of the wheel 2 that is not the target wheel. For this reason, in the case where the vehicle height control is executed for the rear left wheel 2RL in individual control or lateral difference reduction control, in which the actual vehicle height of the front right wheel 2FR is brought close to target vehicle height HrefFR and the actual vehicle height of the rear left wheel 2RL is thereafter brought close to target vehicle height HrefRL, for example, the vehicle height at the front right wheel 2FR is possibly changed due to the accompaniment, and thus the vehicle height control is possibly executed again for the front right wheel 2FR. As a result, control hunting possibly occurs.

In view of the above, in the vehicle height control of this embodiment, the common control for the four wheels is executed as the first control, and the lateral difference reduction control is executed as the second control. In the lateral difference reduction control, the vehicle height control for the wheel 2 that corresponds to the suspension 4 with the large magnitude of the resistance is executed prior to the vehicle height control for the wheel 2 that corresponds to the suspension 4 with the smaller magnitude of the resistance. In the common control, the vehicle height regulating valves 26 that correspond to all of the four wheels are opened, and the air is supplied to/discharged from all of the air cylinders 8 commonly. In the lateral difference reduction control, air supply/discharge control for the air cylinder 8 of either one of the right and left wheels is executed on the front wheel side and the rear wheel side. In this way, the vehicle height at one of the wheels is brought closer to the vehicle height of the other, and the vehicle height difference between the left and right wheels is thereby reduced. The magnitude of the resistance that is generated on the suspension 4 can be acquired as follows.

A magnitude relationship of the resistance generated on the suspension 4 that corresponds to each of the four wheels, a magnitude relationship of the resistance generated on the suspension 4 that corresponds to each of the two wheels among the four wheels, a magnitude relationship of the resistance generated on each of the front wheel side and the rear wheel side, and the like are theoretically computed, experimentally computed, and the like. As a case where the magnitude relationship is theoretically computed, the magnitude of the resistance is determined based on a suspension type (a double wishbone type, a multi-link type, a strut type, or the like). Meanwhile, the friction resistance that is generated in a coupled section between the suspension arm 5 and each of the wheel 2 and the vehicle body 3 is designed separately. Thus, based on these suspension type, design matter of the coupled section, and the like, it is possible to acquire the magnitude relationship of the resistance between the front wheel side and the rear wheel side, the magnitude relationship of the resistance among the four wheels, and the like.

Figures 5, 6:
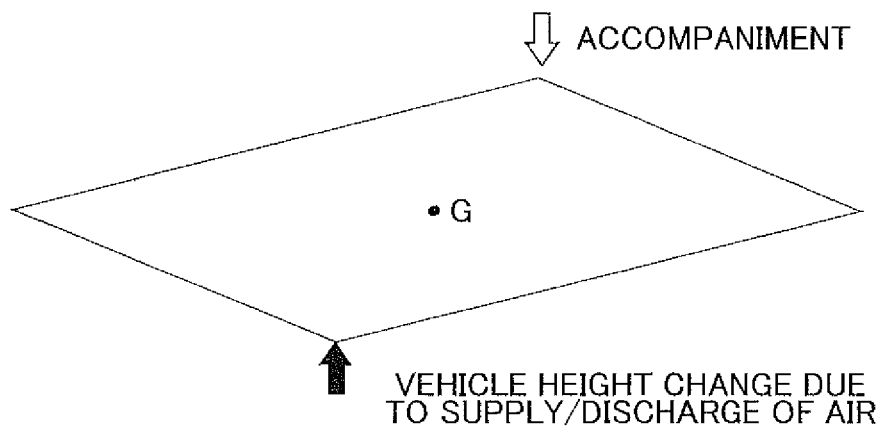
FIG. 5 is a view of a state of vehicle height control at a time when a magnitude relationship of resistance is acquired in the above suspension system.
FIG. 6 is a table that determines an order of the vehicle height control and is stored in a memory section of the above vehicle height control ECU.

One example of an experiment is conceptually shown in FIG. 5. For example, in the case where the front right wheel 2FR is set as the target wheel and the vehicle height thereof is controlled by controlling the supply/discharge of the air to/from the air chamber 19 of the air cylinder 8FR, a vehicle height change amount ΔHRL of the rear left wheel 2RL, which is located at a diagonal position from the front right wheel 2FR as the target wheel, is detected. Next, in the case where the rear left wheel 2RL is set as the target wheel and the vehicle height thereof is controlled, a vehicle height change amount ΔHFR of the front right wheel 2FR is detected. Then, these change amounts ΔHRL, ΔHFR are compared. In the case where the change amount ΔHRL is larger than the change amount ΔHFR (ΔHRL>ΔHFR), it can be considered that the resistance generated on the suspension 4RL is lower than the resistance generated on the suspension 4FR. Similarly, when the vehicle height control is executed for the front left wheel 2FL and the rear right wheel 2RR and vehicle height change amounts thereof are detected and compared, the magnitude relationship of the resistance between the suspensions 4FL, RR can be acquired. Then, based on the magnitude relationship of the resistance generated in the suspension 4 that corresponds to each of these two wheels at the diagonal positions from each other, the magnitude relationship of the resistance that is determined theoretically, and the like, it is possible to acquire the magnitude relationship of the resistance generated in the suspension 4 of each of the four wheels.

Figure 7:
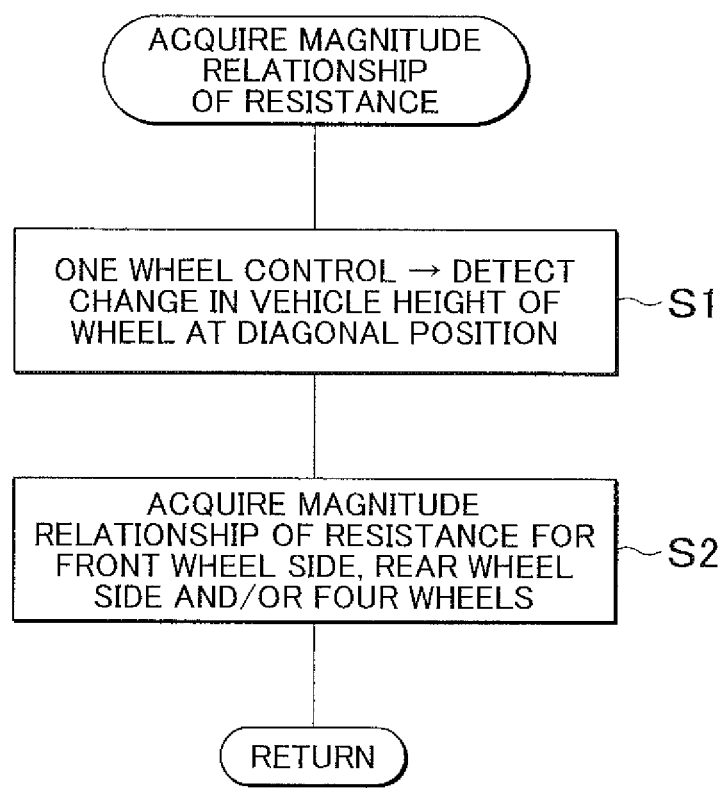
FIG. 7 is a flowchart of an order learning program that is stored in the memory section of the above vehicle height control ECU.

A magnitude relationship acquisition program represented by a flowchart in FIG. 7 is performed at a vehicle factory or the like before shipment of the vehicle. However, the program can also be performed at a repair shop, a maintenance shop, or the like after the shipment of the vehicle. In addition, the magnitude relationship can be modified through learning. In step 1 (will hereinafter be abbreviated as S1, and the same applies to the other steps), for each of two pairs of the wheels 2 that are located at the diagonal positions from each other, one of the paired wheels 2 is set as the target wheel, and the vehicle height change amount of the other is detected. In S2, the magnitude relationships of the resistance among the suspensions 4 of the four front/rear, left/right wheels are acquired based on the vehicle height change amounts, which are acquired in S1, the suspension type, the design matter for the friction resistance on the coupled sections, and the like. One example of this case is shown in FIG. 6. In FIG. 6, the resistance of the suspension 4 is higher for the wheels 2 that are ranked above than for the wheels 2 that are ranked below. In this embodiment, the table shown in FIG. 6 is acquired in advance and is stored in the memory section 80m. In this embodiment, an order in the lateral difference reduction control is determined on the basis of FIG. 6. For example, in the case where the vehicle height control is executed for the front left wheel 2FL on the front wheel side and the rear right wheel 2RR on the rear wheel side, the vehicle height control for the rear right wheel 2RR is executed prior to the vehicle height control for the front left wheel 2FL. Note that the acquisition of the magnitude of the resistance on the suspension 4 that corresponds to each of the four wheels is not essential and there is a case where the magnitudes of the resistance may be acquired on the front wheel side and the rear wheel side.

Figure 8A:
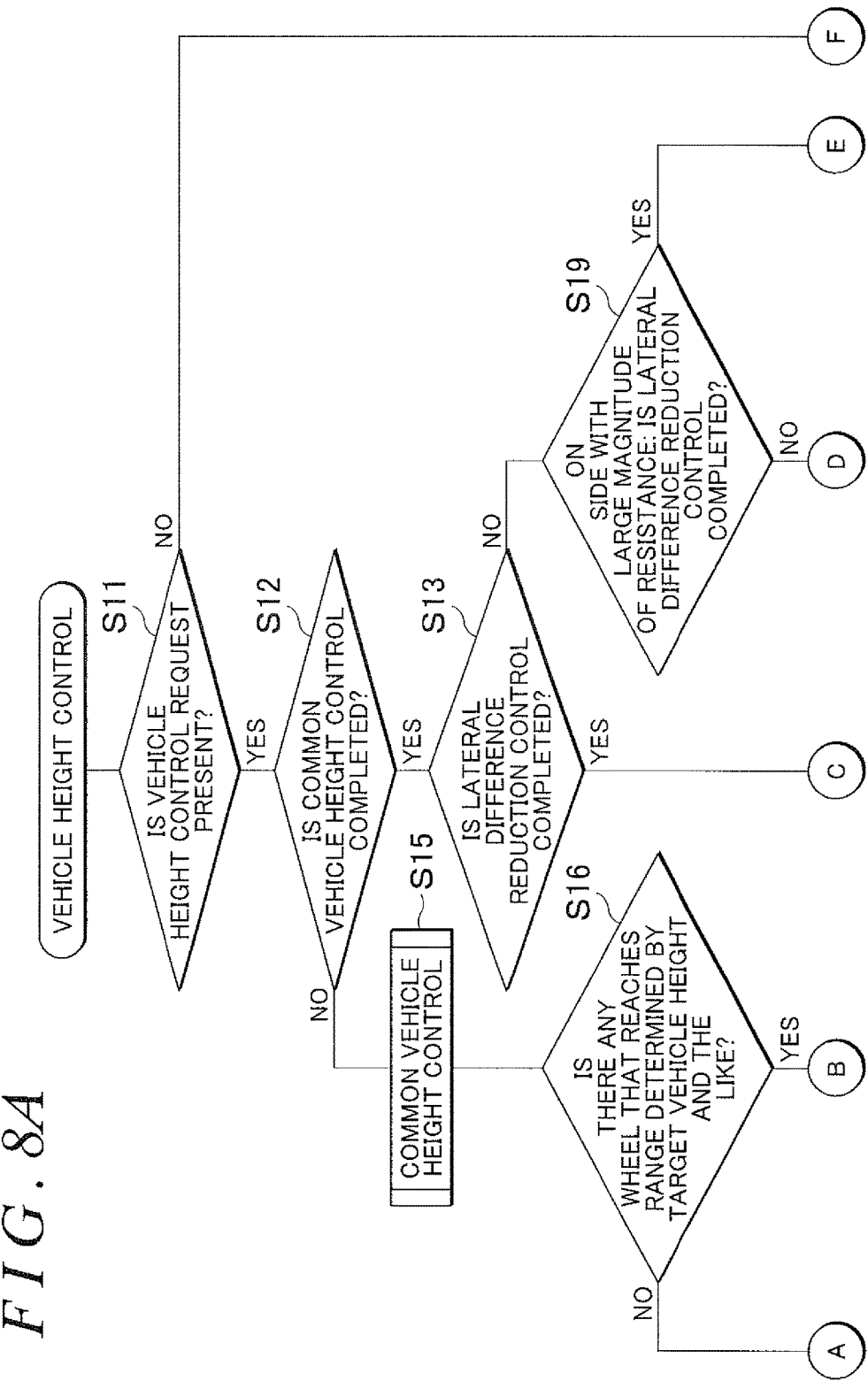
FIG. 8A is a flowchart of a vehicle height control program that is stored in the memory section of the above vehicle height control ECU.

A vehicle height control program that is represented by a flowchart in FIG. 8A and FIG. 8B is executed at every setup time that is predetermined. In S11, it is determined whether a vehicle height control request is present. As described above, in the case where the vehicle height switching switch 88, the vehicle height control switch 89 for boarding, or the like is operated, where the appearance improvement condition is established, or the like, it is determined that the vehicle height control request is present. If the vehicle height control request is present, it is determined in S12 whether the common control is completed, and then it is determined in S13 whether the lateral difference reduction control is completed. If both of the common control and the lateral difference reduction control are completed, vehicle height control termination processing is performed in S14. If the common control is not completed, a determination in S12 is NO, the common control is executed in S15, and it is then determined in S16 whether the actual vehicle height of the at least one wheel enters the range determined by the target vehicle height and the dead zone width. When the vehicle height is increased, the electric motor 42 is driven in a state where: the circuit valves 61, 64 are opened; the circuit valves 62, 63 are closed; and all of the vehicle height regulating valves 26 are opened. When the vehicle height is lowered, the electric motor 42 is driven in a state where: the circuit valves 61, 64 are closed; the circuit valves 62, 63 are opened; and all of the vehicle height regulating valves 26 are opened. For any of the wheels 2, if the actual vehicle height does not reach the range that is determined by the target vehicle height and the dead zone width, S11, 12, 15, and 16 are repeatedly executed. If the actual vehicle height of at least one of the wheels eventually reaches the range that is determined by the target vehicle height and the dead zone width, a determination in S16 is YES, common control termination processing is performed in S17, and a common control completion flag is turned ON in S18. As the common control termination processing, processing for bringing all of the vehicle height regulating valves 26 into closed states is included, for example.

Because the common control completion flag is turned ON, the determination in S12 is YES. However, because the lateral difference reduction control is not completed, a determination in S13 is NO. It is determined in S19 whether the lateral difference reduction control for the suspension 4 on the side with the large magnitude of the resistance, that is, the suspension 4 on the rear wheel side in this embodiment is completed. Of the suspensions 4 on the front wheel side and the rear wheel side, i represents the suspension 4 on the side with the large magnitude of the resistance while j represents the suspension 4 on the side with the small magnitude of the resistance. If the lateral difference reduction control is not completed on the side with the large magnitude of the resistance, it is determined in S20 whether an absolute value wheels 2RL, RR on the rear wheel side (i=R) is larger than a threshold ΔHth. If the absolute value of the difference is at most equal to the threshold ΔHth, the lateral difference reduction control is not executed, and a first completion flag is turned ON in S22. On the other hand, if the absolute value of the difference is larger than the threshold ΔHth, the lateral difference reduction control is executed in S21. Then, when the lateral difference reduction control is completed, the first completion flag is turned ON. The lateral difference reduction control will be described below. When the lateral difference reduction control on the rear wheel side is completed, a determination in S19 becomes YES, and the lateral difference reduction control is executed on the front wheel side that is the side where the magnitude of the resistance generated in the suspension is small in S23 to 25. It is determined whether an absolute value of a vehicle height difference between the right and left wheels 2FL, FR on the front wheel side (j=F) is larger than the threshold ΔHth. If the absolute value is larger than ΔHth, the lateral difference reduction control is executed in S24, and a second completion flag is turned ON in S25. Then, if both of the first completion flag and the second completion flag are turned ON, the determination in S13 becomes YES, and the vehicle height control termination processing is performed in S14. For example, the electric motor 42 is stopped, the circuit valves 61 to 64 are closed, and all of the vehicle height regulating valves 26 are closed. Note that there is a case where the vehicle height control is continuously executed when control of tank pressure or the like is required.

Figure 9:
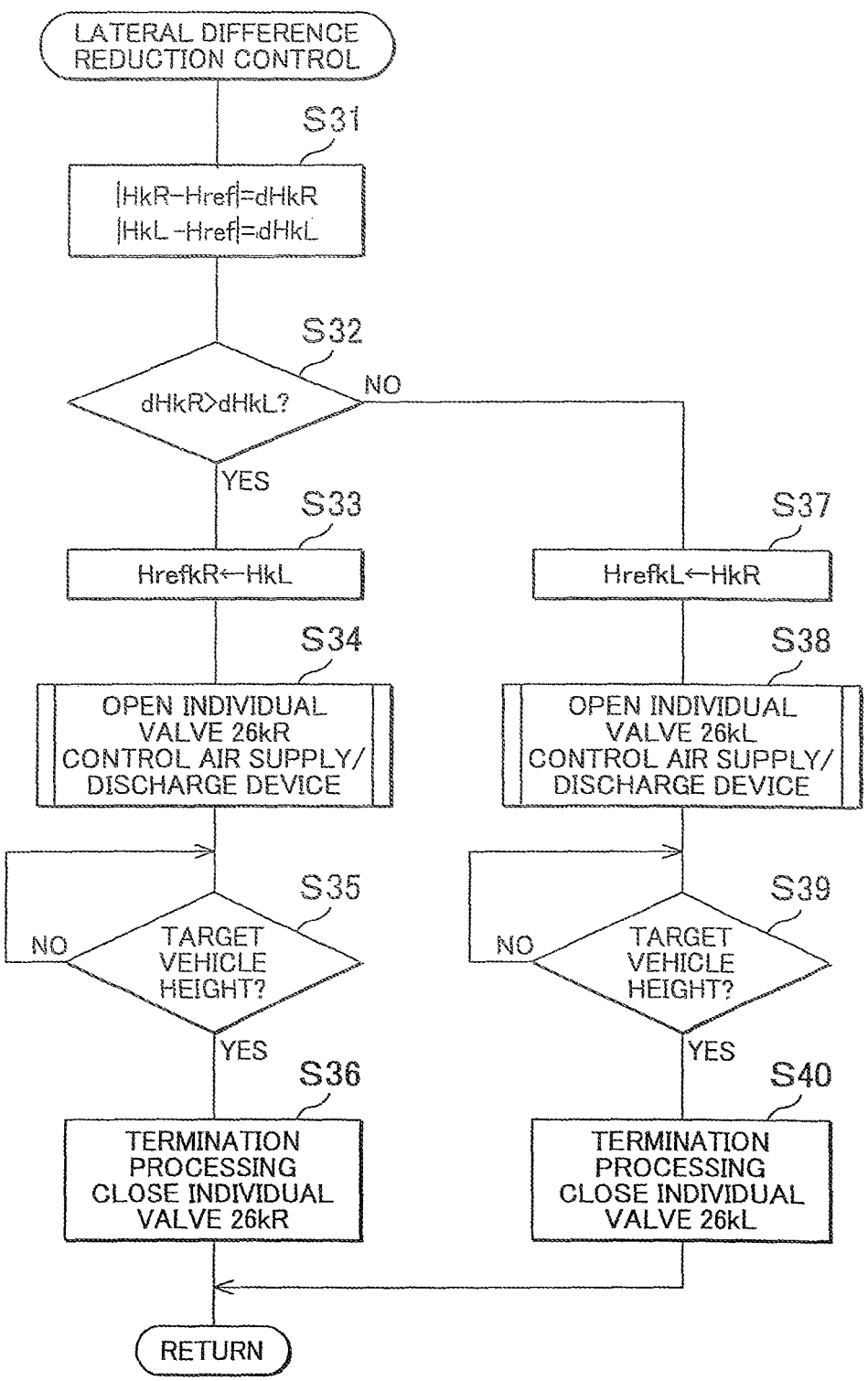
FIG. 9 is a flowchart of a part (lateral difference reduction control) of the above vehicle height control program.

The lateral difference reduction control is shown in a flowchart in FIG. 9. When the lateral difference reduction control is executed on the rear wheel side, R is plugged in for k. When the lateral difference reduction control is executed on the front wheel side, F is plugged in for k. In S31, an absolute value of a deviation from the target vehicle height Href is computed for each of the right and left wheels: |HkR−Href|=dHkR, |HkL−Href|=dHkL. In S32, these are compared. For example, it is determined whether the absolute value of the deviation of the right wheel is larger than the absolute value of the deviation of the left wheel. If the absolute value of the deviation of the right wheel is larger, the vehicle height of the right wheel is brought close to the vehicle height of the left wheel. In S33, 34, the target vehicle height of the right wheel is set to the actual vehicle height of the left wheel (HrefiR=HkL), the vehicle height regulating valve 26kR is opened, and the actual vehicle height of the right wheel is brought close to the actual vehicle height of the left wheel. When the actual vehicle height of the right wheel is brought close to the actual vehicle height of the left wheel in S35, termination processing is performed in S36. For example, the vehicle height regulating valve 26kR is closed. On the other hand, if the absolute value of the deviation of the left wheel is larger, similarly, in S37 to 40, the target vehicle height of the left wheel is set to the actual vehicle height of the right wheel (HrefkL=HkR), the vehicle height regulating valve 26kL is opened, and the vehicle height control is executed for the left wheel. When the actual vehicle height of the left wheel is brought close to the actual vehicle height of the right wheel as the target vehicle height, the termination processing is performed in S40.

As it has been described so far, the vehicle height control is executed at the two stages of the common control and the lateral difference reduction control in this embodiment. In the lateral difference reduction control, the vehicle height control is executed first for the suspension on the side with the large magnitude of the resistance. Accordingly, when the vehicle height control is executed for the suspension on the side with the small magnitude of the resistance, the accompaniment is less likely to occur. In addition, the vehicle height is less likely to be changed on the side with the large magnitude of the resistance, or the change amount of the vehicle is reduced. As a result, the actual vehicle height of all of the four wheels can promptly be brought close to the target vehicle height. In addition, in the appearance improvement vehicle height control, the vehicle can promptly be controlled to have a posture that produces attractive appearance. Furthermore, because a total vehicle height change amount can be reduced in the lateral difference reduction control, a time required for the vehicle height control can be reduced. Consumed electric power can be reduced, and a reduction in a battery capacity can be suppressed. Moreover, the number of actuation of components in the vehicle height control system can be reduced, which results in extended life of the system. In order to suppress the accompaniment, a vehicle height lock mechanism can be provided to lock the change in the vehicle height. However, such a case raises a problem of increased cost. On the other hand, in this embodiment, the vehicle height change caused by the accompaniment can favorably be suppressed while cost increase is suppressed.

As it has been described so far, in this embodiment, a portion of the vehicle height control ECU 80 that stores the vehicle height control program shown by the flowchart in FIG. 8A and FIG. 8B, a portion thereof that executes the program, and the like constitute a vehicle height controller. Of the portions, a portion that stores S12, 15 to 18, a portion that executes these steps, and the like constitute a common control section, and a portion that stores S19 to 25, a portion that executes these steps, and the like constitute a sequential control section that is a lateral difference reduction control section. In addition, a portion of the vehicle height control ECU 80 that stores a resistance magnitude relationship acquisition program shown by the flowchart in FIG. 7, a portion thereof that executes the program, and the like constitute a magnitude relationship acquisition section, and a portion of the memory section 80m that stores the table shown in FIG. 6 and the like constitute a magnitude relationship memory section.

Note that the execution of the common control and the lateral difference reduction control for the four wheels is not essential and an aspect of the vehicle height control is not limited. For example, as the first control, the common control for the rear right and left wheels and the common control for the four wheels can alternately be executed. In addition, the individual control, in which the actual vehicle height of each one of the four wheels is brought close to the target vehicle height, can be executed. Furthermore, as the second control, the individual control can be executed. In the individual control, the actual vehicle height can be brought close to the target vehicle height in a descending order of the magnitude of the resistance generated in the suspensions 4. In addition, in order to acquire the magnitude relationship of the resistance for each of the suspensions, the change amount in the vehicle height of the one side is detected in the same manner for the front right and left wheels 2FL, FR and the rear right and left wheels 2RL, RR when the vehicle height control is executed for the other side. Then, the change amount in the vehicle height of the other side is detected when the vehicle height control is executed for the one side for comparison. In this way, the magnitude relationship of the resistance generated in the suspensions 4 can be acquired for the front wheel side and the rear wheel side. Furthermore, the magnitude relationship of the resistance generated in the suspensions 4 can also be acquired for the front and rear right wheels 2FR, RR and the front and rear left wheels 2FL, RL in a similar manner. Moreover, the magnitude relationship of the resistance on each of the suspensions 4 can also be determined based on the type of the suspension, the design matters of the coupled sections, and the like. Thus, the experiment and the like are not necessarily conducted. A structure of the suspension system is not limited. For example, various aspects have been described so far, including that the pressure medium can take a liquid form. In addition to this, the disclosure can be implemented in an aspect in which various modifications and improvements are made to the disclosure based on the knowledge of those skilled in the art.

(1) A suspension system includes: a suspension that includes a vehicle height control actuator and is provided between each of plural wheels of a vehicle and a vehicle body; a pressure medium supply-discharge device that supplies/discharges a pressure medium to/from each of the vehicle height control actuators; a vehicle height controller that controls the pressure medium supply-discharge device so as to control vehicle height that is a distance between each of the wheels and the vehicle body. The suspension system is characterized that resistance that is generated in at least one of the suspensions at a time of a change in the vehicle height is larger than resistance on at least another one of the suspensions, and that the vehicle height controller includes a sequential control section for executing vehicle height control for the wheel that corresponds to the at least one suspension with the large magnitude of the resistance prior to vehicle height control for the wheel that corresponds to at least the other one suspension with the small magnitude of the resistance. The suspension includes the vehicle height control actuator, a shock absorber, suspension arms, and the like. Each of the suspension arms is likely to be coupled to the wheel and the vehicle body via a rubber hush, a ball joint, and the like in a manner to allow relative rotation thereof. In the shock absorber, a cylinder body and a piston can move (slide) relative to each other in a vertical direction. Just as described, due to relative rotation of each of the suspension arms to the wheel and the vehicle body as well as due to relative movement of the cylinder body and the piston in the shock absorber, the vehicle height can be changed. However, friction resistance or fluid resistance is applied during these relative rotation and relative movement. Meanwhile, the vehicle body is a rigid body and is supported by the four front/rear, right/left wheels. Accordingly, when the vehicle height control is executed for one or two target wheels of the four wheels, so-called accompaniment possibly occurs in which the vehicle height of each of the wheels that are not the target wheels is changed. For this reason, for example, in the case where the vehicle height control is executed for a wheel A to bring actual vehicle height thereof close to target vehicle height HA and the vehicle height control is executed thereafter for a wheel B that differs from the wheel A to bring actual vehicle height thereof close to target vehicle height HB, there is a case where the vehicle height of the wheel A is changed due to the accompaniment and deviates from target vehicle height HA when the vehicle height control is executed for the wheel B. In such a case, the control hunting possibly occurs, including a case where the vehicle height control is executed again for the wheel A. On the other hand, compared to a case where the resistance on the suspension is small, the accompaniment is less likely to occur in the case where the resistance on the suspension is large. Thus, in the suspension system described in this item, the vehicle height control for the wheel B with the larger magnitude of the resistance generated in the suspension during the change in the vehicle height is executed prior to the vehicle height control for the wheel A with the small magnitude of the resistance. Because the accompaniment is less likely to occur to the wheel B with the large magnitude of the resistance, the actual vehicle height of each of the wheels A, B can promptly be brought close to the target vehicle height. In addition, a vehicle posture can promptly be brought close to a target posture, and thus a time required for the vehicle height control can be reduced.

(2) In the above aspect, the sequential control section may include a magnitude relationship memory section that stores a table representing magnitude relationships of the resistance among the suspensions. For example, "a magnitude relationship between the resistance generated in the suspensions of the wheels on the rear wheel side and the resistance generated in the suspensions of the wheels on the front wheel side", "a magnitude relationship between the resistance generated in the suspension of one of the four front/rear, right/left wheels and the resistance generated in the suspension of another wheel", "an order of the magnitudes of the resistance generated in the suspensions of the four front/rear, right/left wheels", and the like correspond to the magnitude relationships of the resistance. In the case where the table representing the magnitude relationships is acquired and stored in advance, an execution order of the vehicle height control can be determined in accordance with this table. There are cases where the magnitude relationships of the resistance are theoretically acquired, where the magnitude relationships of the resistance are experimentally acquired, and the like. For example, the magnitude relationships of the resistance can theoretically be acquired based on a type of the suspension, design of the coupled section, design of the shock absorber, and the like.

(3) In the above aspect, the sequential control section may include a magnitude relationship learning section that learns the magnitude relationships of the resistance of the suspensions. For example, during the vehicle height control for at least one wheel, a change amount of the vehicle height that is caused by the accompaniment of another wheel is acquired for comparison. In this way, the magnitude relationship can be learned. Such learning may be performed when the vehicle height control is actually executed or during repair or maintenance.

(4) In the above aspect, of the wheels of the vehicle, the resistance of each of the suspensions that correspond to the wheels belonging to one side of the front wheel side and the rear wheel side may be larger than the resistance of each of the suspensions that correspond to the wheels belonging to the other side of the front wheel side and the rear wheel side, and the sequential control section may execute the vehicle height control for wheels that belong to the one side prior to the vehicle height control for the wheels that belong to the other side. For example, the suspension that corresponds to each of the wheels belonging to the one side may correspond to "the at least one suspension described in the item (1)", and the suspension that corresponds to each of the wheels belonging to the other side may correspond to "at least the other one of the suspension described in the item (1)".

(5) In the above aspect, the sequential control section may execute the control for bringing the actual vehicle height of the wheel, which is either the right wheel or the left wheel belonging to the one side and for which the absolute value of the difference between the actual vehicle height and the target vehicle height is large, close to the actual vehicle height of the wheel, for which the absolute value of the difference is small, prior to the control for bringing the actual vehicle height of the wheel, which is either the right wheel or the left wheel belonging to the other side and for which the absolute value of the difference between the actual vehicle height and the target vehicle height is large, close to the actual vehicle height of the wheel, for which the absolute value of the difference is small. In the suspension system described in this item, inclination of the vehicle body can be reduced, and appearance of the vehicle can be improved.

(6) In the above aspect, the vehicle may include the four wheels of the front right/left wheels and the rear right/left wheels. The vehicle height controller may include: the common control section that commonly controls the vehicle height of the four wheels; and an individual control section that individually controls the vehicle height of at least two wheels of the four wheels. The sequential control section may be included in the individual control section.

(7) In the above aspect, the individual control section may include a lateral difference reduction control section that controls the vehicle height of at least one of the right/left wheels for each of the front right/left wheels and the rear right/left wheels so as to reduce the vehicle height difference therebetween.

(8) In the above aspect, the vehicle may include the four wheels of the front right/left wheels and the rear right/left wheels. The vehicle height controller may include: an approximate control section that brings the vehicle height of the four wheels close to the target vehicle height; and the lateral difference reduction control section that reduces the vehicle height difference between the right and left wheels on each of the front wheel side and the rear wheel side. The sequential control section may be included in the lateral difference reduction control section.

What is claimed is:

1. A suspension system comprising:
    suspensions that respectively include vehicle height control actuators provided between a plurality of wheels of a vehicle and a vehicle body;
    a pressure medium supply-discharge device configured to supply a pressure medium to each of the vehicle height control actuators or discharge the pressure medium from each of the vehicle height control actuators; and
    a vehicle height controller including a central processing unit and configured to control the pressure medium supply-discharge device to control a vehicle height that is a distance between each of the plurality of wheels and the vehicle body, wherein
    a magnitude of resistance that is generated during a change in the vehicle height at a first one or more of the suspensions is larger than a magnitude of resistance at a second one or more of the suspensions different from the first one or more of the suspensions, and
    the vehicle height controller is configured to execute vehicle height control for the wheel that corresponds to the first one or more of the suspensions with the larger magnitude of the resistance prior to executing the vehicle height control for the wheel that corresponds to the second one or more of the suspensions with a smaller magnitude of the resistance in response to a vehicle height control request when the vehicle height is being increased and when the vehicle height is being decreased.

2. The suspension system according to claim 1, wherein the vehicle height controller is configured to store a table that represents magnitude relationships of the resistance among the suspensions.

3. The suspension system according to claim 1, wherein the vehicle height controller is configured to learn magnitude relationships of the resistance among the suspensions.

4. The suspension system according to claim 1, wherein the magnitude of the resistance on the suspension that corresponds to each of the wheels belonging to one side of a front wheel side and a rear wheel side is larger than the magnitude of the resistance on the suspension that corresponds to each of the wheels belonging to the other side of the front wheel side and the rear wheel side, and the vehicle height controller is configured to execute control for bringing an actual vehicle height of the wheel, which is a left wheel or a right wheel belonging to the one side and for which an absolute value of a difference between the actual vehicle height and a target vehicle height is large, close to the actual vehicle height of the wheel belonging to the one side, for which the absolute value of the difference is small, prior to executing control for bringing the actual vehicle height of the wheel, which is a left wheel or a right wheel belonging to the other side and for which the absolute value of the difference between the actual vehicle height and the target vehicle height is large, close to the actual vehicle height of the wheel belonging to the other side, for which the absolute value of the difference is small.

5. The suspension system according to claim 1, wherein the vehicle height controller is configured to:
    control commonly the vehicle height of the plurality of wheels; and
    control individually the vehicle height of at least one of the left wheel and the right wheel so as to reduce a vehicle height difference between the left wheel and the right wheel on each of a front wheel side and a rear wheel side.

* * * * *